INVENTORS
EVERETT M. KEEN
ANTHONY SICILIANO
SERGE ARTAMANOFF

BY *Albert H. Kirchner*

ATTORNEY

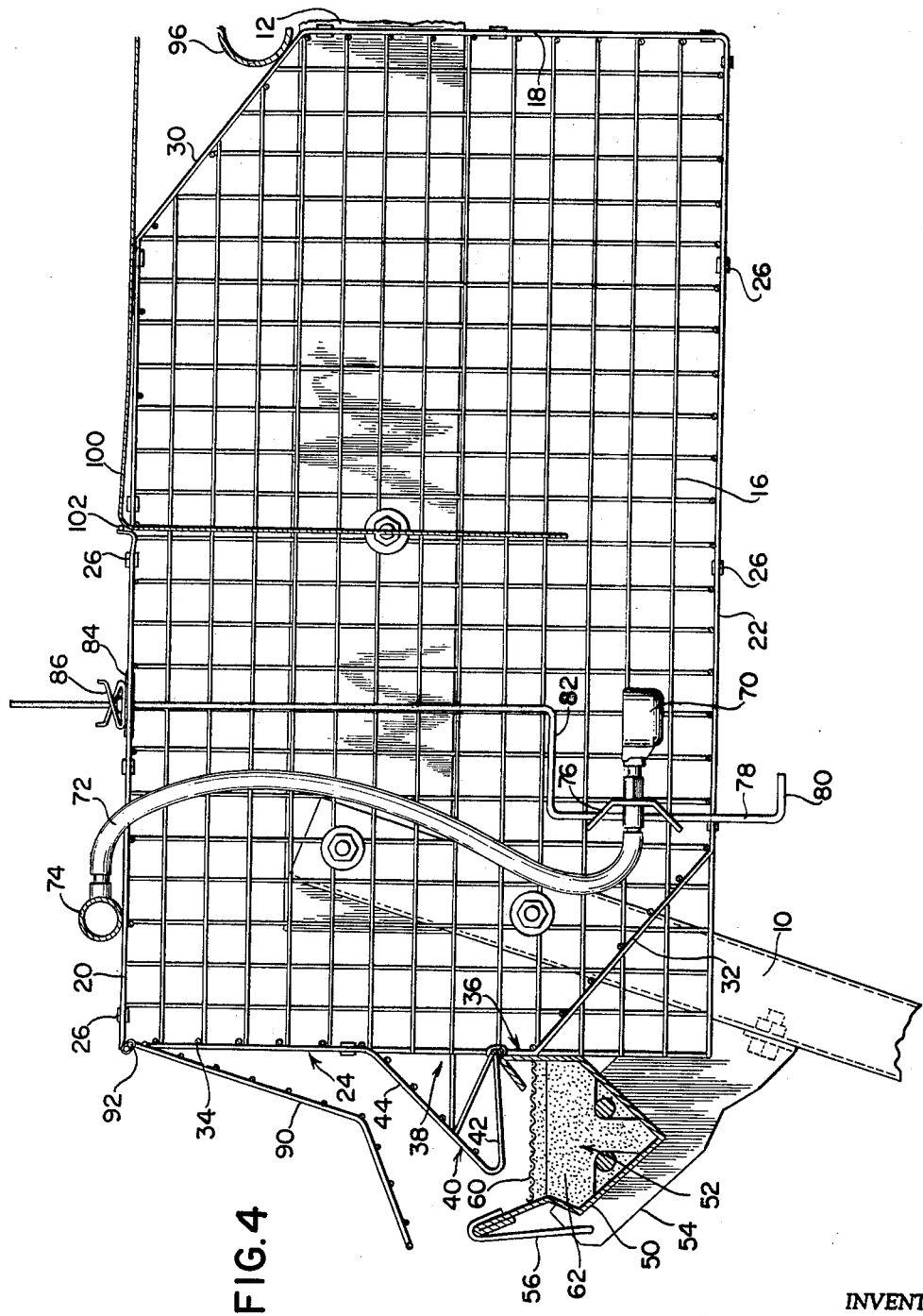

United States Patent Office 3,492,970
Patented Feb. 3, 1970

3,492,970
STARTER-GROWER CAGE FOR CHICKS
Everett M. Keen, Anthony J. Siciliano, and Serge Artamanoff, Millville, N.J., assignors, by mesne assignments, to Diamond International Corporation, New York, N.Y., a corporation of Delaware
Filed June 9, 1967, Ser. No. 644,912
Int. Cl. A01k 31/06
U.S. Cl. 119—18    3 Claims

ABSTRACT OF THE DISCLOSURE

The front portion of the cage floor is formed as an upwardly sloping ramp on which the chicks stand and extend their heads through a slot in the cage front wall, into a spatial extension structure bulged out from said wall, and project their beaks down into a feed trough disposed outside the cage beneath the extension; a water cup is vertically adjustable in the cage remote from the feed trough; and the cage is divided by a paper curtain into front and rear zones of different temperatures.

---

The present invention relates to poultry husbandry and more particularly provides an improvement in starter-grower cages for chicks.

In the present day poultry industry the large scale production of chicks, whether for eventual consignment to egg-laying batteries or for raising as fryers, broilers or the like, involves transfer of the birds, some four days after hatching, into starter-grower cages where they are kept confined, with access to ample feed and water, for a period of some twenty weeks or until they mature as layers or become marketable as fryers, etc.

Because of the initial very small size of the entering chicks and their rapid growth during the early period of their confinement in the starter-grower cages, these cages require certain structural features that distinguish them from other cages and confining enclosures.

A principal object of the present invention is to provide a starter-grower cage which will accommodate a flock of entering small chicks and contain them throughout a considerable period of their growth most efficiently, with low cost of construction and maintenance, maximum compactness, minimum waste of feed, and minimum attention and surveillance by the poultryman.

More specifically, a principal object of the present invention is to provide a static cage structure in which the feed supply is maintained in a fixed position trough that requires no adjustment in order to render its contained feed always accessible to the chicks, with equal and constant facility regardless of their increasing height and size.

Related objects are concerned with producing a cage for the foregoing purposes which, without any change, adjustment, addition or alteration in structure, will satisfy all the requirements of the grown and growing chicks and necessitate no care or maintenance whatever, beyond supply of feed and water and thinning out of the number of birds in the cage as the developing chicks overcrowd the enclosure, throughout the whole period of time that the chicks occupy the cage.

Other objects are to provide a cage of the class indicated in which a choice of zones of different temperature will be presented for selection by individual chicks, which will insure ready access to feed and water at all times by all the encaged birds, which will reduce wastage of feed to a minimum and will eliminate contamination of feed by water splashed from the drinking supply, and which will in general, and in numerous particular ways hereinafter to be made evident, improve the efficiency, economy and simplicity of operation of the chick-raising industry.

A preferred embodiment of the invention, which has been built and tested in actual practice and been found to be entirely satisfactory in operation, and which is accordingly at present preferred, is illustrated in the accompanying drawings, in which FIGURE 1 is an end elevational view of a battery showing two tiers of starter-grower cages constructed and erected in accordance with the invention;

FIG. 4 is a vertical cross sectional view of one of the cages shown at the left in the upper tier of FIG. 1, taken on the line 4—4 of FIG. 2.

Figure 1:
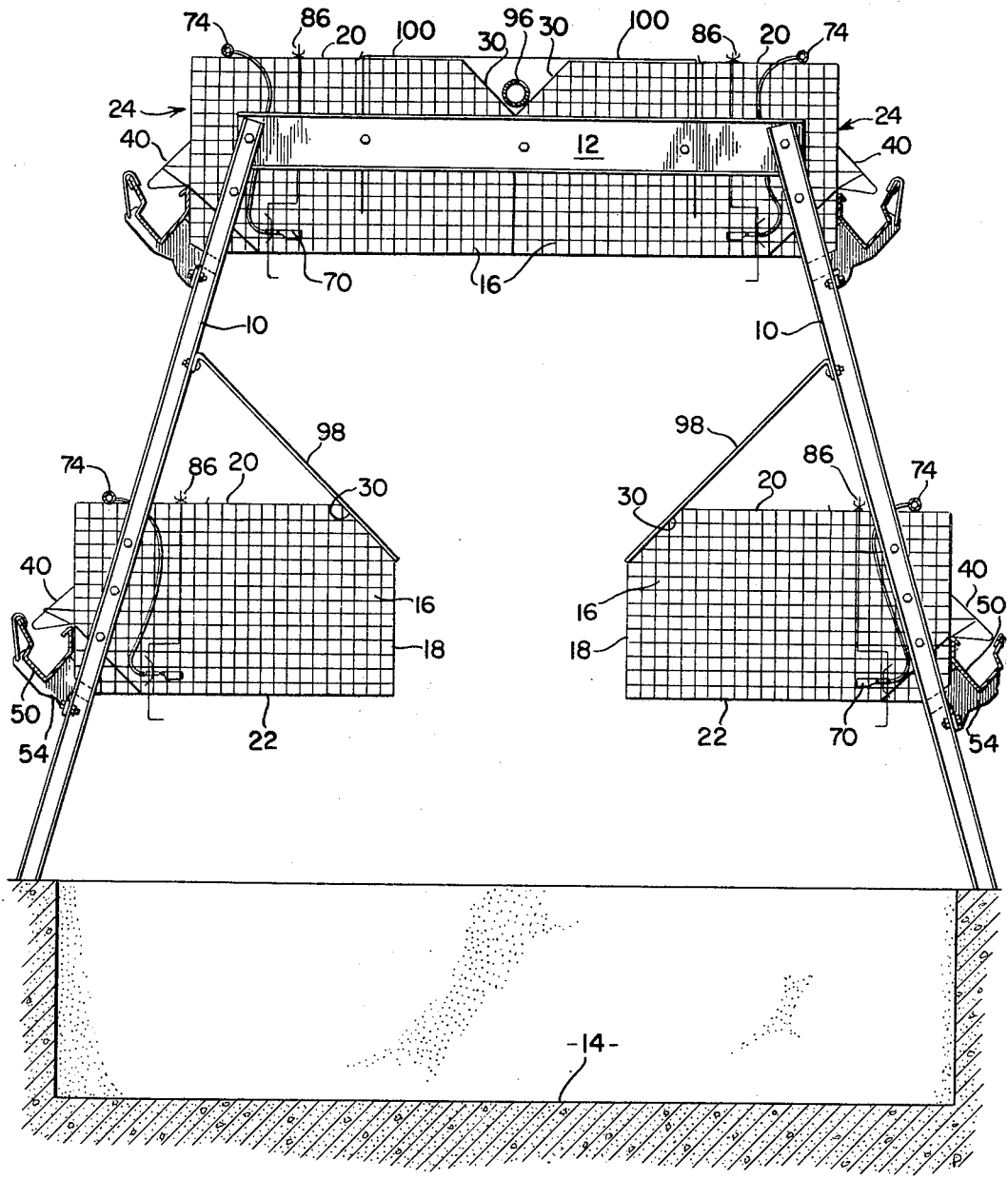
Figure 2:
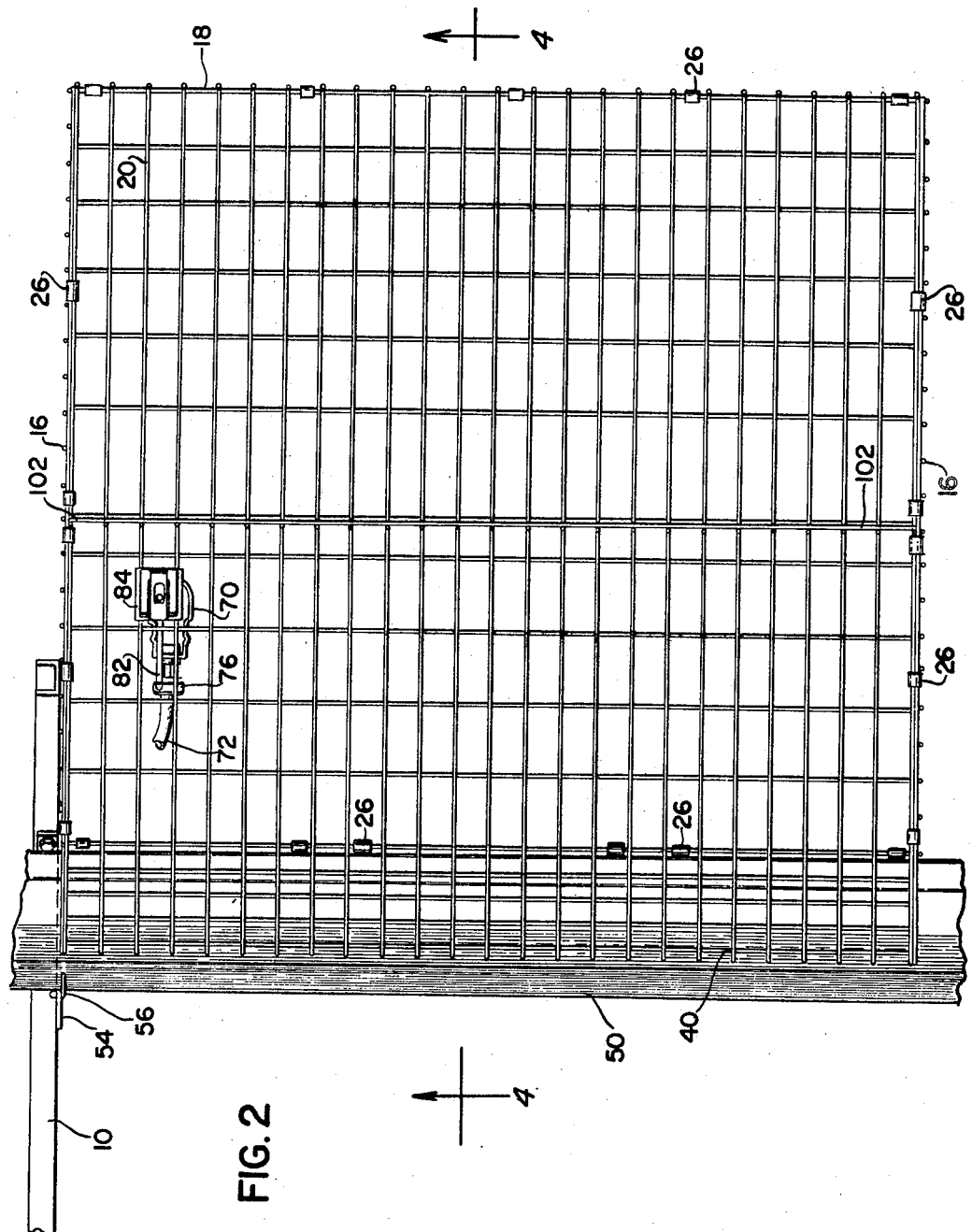
FIG. 2 is a top plan view, on a relatively enlarged scale, of the cage shown at the left in the upper tier of FIG. 1.
Figure 3:
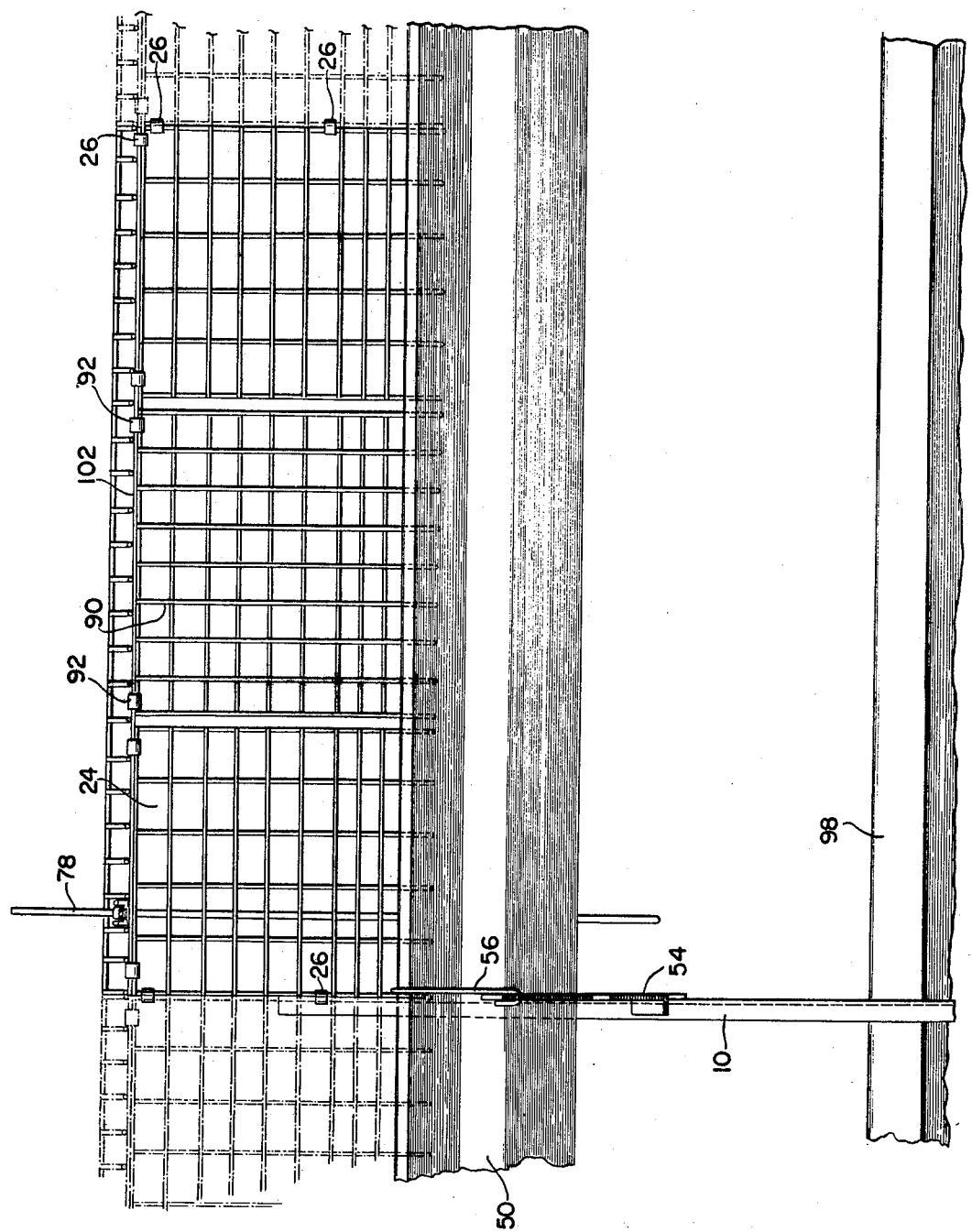
FIG. 3 is a front elevational view, on substantially the scale of FIG. 2, of a portion of the battery shown in FIG. 1, showing a cage of the upper tier and portions of the two adjoining cages.

Referring now to these figures, and first to FIG. 1:

The cages which constitute the invention are shown erected in battery form, in side by side series in two tiers, comprising two lines of cages each. Support is provided by a stout framework of structural iron members comprising a pair of upwardly and inwardly sloping uprights 10, 10, having bolted across their tops a cross member 12 and spanning a dropping pit 14. This framework is repeated at intervals along the length of the battery and has the end walls of the individual cages bolted to it as shown in FIG. 1.

The cages are identical. They are made of stout wire mesh and each comprises a pair of end walls 16, a rear wall 18, a roof 20, a floor 22, and a front wall designated 24 in its entirety. Each wall, roof and floor element is a panel of the wire mesh material, substantially flat and rectangular except as hereinafter noted, and joined to the adjacent elements by small sheet metal clips 26 which clamp together abutting parallel wires of the contiguous panels to assemble the elements into a rigid box cage in a manner well known in the art. Neither the means nor the manner of assembly of the panels is any part of the present invention, nor is the size of the cage or of the mesh, although for maximum convenience and efficiency certain sizes, dimensions and proportions are preferred and will be suggested hereinafter.

Each cage end wall 16 is a panel which is rectangular in shape except for an angularly cut-off corner shown at 30 in FIGS. 1 and 4.

Each roof 20, rear wall 18 and floor 22 element may be formed of an individual wire mesh panel element, fastened to the two end walls 16 by clips 26, or all three of the elements may be combined and formed by different portions of a single sheet of the mesh appropriately bent at its edges to merge into and form the next adjacent panel element. Similarly with the front wall 24. Its upper portion, hereinafter to be described, may be a separate panel clipped at its top edge to the forward edge of the roof, or it may be continuous with the roof and simply bent down therefrom. The lower portion of the front wall 24, hereinafter to be described, may be a panel separate from the floor 22 clipped to the floor at the front edge thereof, or it may be continuous with the floor and simply bent up therefrom.

In the preferred embodiment, which has been found to be capable of being most economically cut from the rolls of mesh material and most expeditiously assembled, the lower portion of the front wall, the entire floor, and the rear wall are formed from a single panel, appropriately bent at the front and rear edges of the floor; the upper portion of the front wall is another panel; and the roof is formed of two panels: a front one extending about half way back toward the plane of the rear wall, and a rear panel running from the rear edge of that front panel to the upper edge of the rear wall, being bent obliquely to conform to the cut-off corner 30 of the end wall 16.

An important feature of the invention is the formation of the floor 22 by which the floor merges at its front or forward zone in a ramp 32 which slopes forwardly and upwardly at an angle of approximately 45°, as is best shown in FIG. 4.

A similarly important feature of the invention is the formation of the front wall 24 by which this wall is provided with a slot or opening extending across its entire width, from one end wall to the other. The opening in the presently described embodiment is formed by dividing the front wall into two portions, an upper one 34 depending from the roof 20, and a lower one 36 rising from the front or forward edge of the ramp 32, leaving an open space between the opposed edges of the two portions. The slot is designated 38 in FIG. 4.

The slot 38 is closed by an extension structure 40, which is conveniently formed as a continuation of the panel which forms the upper portion 34 of the front wall 24. The extension structure, so designated because it serves to provide a spatial extension or enlargement of the enclosure constituted by the cage, comprises two portions: a floor 42 extending out horizontally from the bottom of the slot 38, i.e., from the upper edge of the lower portion 36 of the front wall 24, and a top 44 sloping out forwardly and downwardly from the top of the slot 38, i.e., from the lower edge of the upper portion 34 of the front wall 24. Of course the floor and top of the extension structure are integral with each other, and preferably integral with the upper portion 34 of the front wall 24. The structure is secured into the whole cage combination by clips 26 clamping the rear edge of its floor to the top edge of the lower portion of the front wall 24.

The result and effect of the above described cage design are a spatial extension of the cage enclosure extending out from the entire front of the cage, as will be understood.

Immediately beneath this extension the invention provides a feed trough. This is shown at 50 in the drawings and may be of any suitable known type, such as the sheet metal structure of V-shape cross-section shown, which may be provided with power driven endless chain flight-equipped conveyor means 52 for maintaining constantly, or intermittently as desired, a supply of feed 62 in the trough.

The trough is conveniently secured in position, with its rear wall, preferably made lower than its front wall, abutted against the lower portion 36 of the cage front wall 24, by nesting it in suitable heavy sheet metal V-cut brackets 54 which are bolted to the frame uprights 10. Hooks 56 with double ends engaged respectively in holes in the brackets and over the outer lip of the trough serve to hold the trough tightly down in the brackets and securely up against the front wall of the cage.

The utility and operation of the structure thus far described are as follows:

Chicks, four days old more or less, are put into the cage in a number small enough to permit movement of the individual birds over the mesh floor and up the ramp 32 for access to feed in the trough 50. The chicks stand on the ramp, project their heads through the slot 38 in the front wall 24, into the spatial extension of the enclosure formed by the extension structure 40, and project their beaks down through the extension floor 42 into feed in the trough. To minimize scattering of the feed, particularly when the chicks are very small and it is consequently necessary to keep the trough filled to a high level, it is desirable to "float" on the top of the feed 62 a strip of mesh material 60 to serve as a guard. This may be removed as the chicks become larger and scattering can then be prevented by keeping the feed at a lower level in the trough. The chicks instinctively stand on such portion of the ramp, close to the top and front, or back therefrom, as best suits their convenience in getting at the feed. When very small, the chicks stand near the top of the ramp. As they grow larger they stand farther back. At all stages of their growth the relationship of their beaks, in feeding, with the trough and its edges, and with the feed in the trough, is at optimum efficiency for access to the feed and prevention of scattering and spilling. This efficiency has been the object sought to be accomplished in the best prior art starter-grower cages by making the feed supply, i.e., the trough, movable, up and down or forward and rearward, for adjustment as the chicks increased in size and height. The present invention eliminates the adjustment structure and the need for making adjustments. It substitutes the automatic, instinctive positioning of the chicks themselves for accomplishing all the desired results.

Water is provided by installing in each cage a single small water cup 70. This is a known device the details of which are not part of the present invention, but its mounting and the manner of its cooperation with the novel cage structure and feed trough location are new and part of the inventive concept. The cup is made of plastic or the like and is supplied through a brass nipple to which is connected a rubber or plastic tube 72 from a water main 74 mounted on the top of the cage and extending along the entire battery of cages. A conventional float valve in the cup maintains the water level.

The present novelty of the cup installation is the manner of its mounting and its location. In order to prevent wetting of the feed by water splashed from the cup, the cup is located well back in the cage. To make the cup readily available to chicks of all sizes throughout their growth period in the cage, the cup is fixed by a perforated plate 74 on a rod or stout wire 78. This wire is bent, as best shown in FIG. 4, so as to have a bottom foot 80 which is projected through the cage floor 22, and formed with a horizontal run 82 which directly and somewhat closely overlies the cup. The upper part of the wire extends up through the cage roof 20, where it passes through a perforated small plate 94 clipped into the mesh of the roof, with a spring clamping clip 86 adjustable on the wire. As will be apparent, the plate 84 establishes the location of the cup in the cage, i.e., its distance back from the trough; the cup can be elevated or lowered by adjusting the clip 86 on the wire; the guard 82 keeps the chicks from perching on the cup; and from time to time as may be required the cup can readily be cleaned of polluted water by lifting the wire and shaking it to splash the water out of the cup. In this operation the foot 80 will prevent undesired movement of the wire up through the cage floor. Access into the cage may be provided by cutting a doorway into the central area of the upper front wall portion 34 and hinging a door 90 to the front edge of the roof 20 in covering relation to this opening. As shown in FIG. 4, the hinging may be by means of clips 92 similar to the clips 26, and if, as is preferred, the doorway extends down into the zone of the extension structure 40, the door should conform to the shape of the structure, or at least to the top 44 thereof.

The cut-off corners 30 of the two back-to-back opposed upper cages in the battery shown in FIG. 1 form a lengthwise pocket well adapted to contain a heating pipe 96.

These cut-off corners 30 of the two spaced apart lower cages provide abutments or rests for droppings guard plates 98 that are hung from the frame uprights 10 and cover the lower cages to shield them from droppings from the upper cages. Plastic coated sheet metal has been found ideal for this purpose because the droppings tend either not to stick to this material or they can from time to time readily be scraped off and into the pit 14.

In combination with the heating pipe 96, or other heating means that may be employed, a heat zone dividing curtain has been found useful. In the illustrated embodiment of the invention this curtain 100 consists of a sheet of suitable heavy paper which is hung down through a slot 102 formed in the roof 20 so as to divide the cage enclosure into two zones. It has been found that the temperature differential on opposite sides of such a curtain, hung with its bottom some three inches above the floor of the cage to facilitate passing by the chicks, is some ten degrees more or less; e.g., with a temperature of 80° to 87° behind the curtain, the temperature in front of it will be of the order of 70°. This is advantageous, not only in economizing with respect to the amount of heat that must be supplied, but also in providing the chicks with a choice of temperature as may be required by their size, physical condition, the time they "feather out," or even their individual mood or temperament.

In practice it is found that after the chicks are some six weeks old the curtain has served its usefulness, whereupon it is removed and burned.

While the dimensions and proportions are generally not critical and form no part of the invention, it may be useful to recommend to those skilled in the art certain desirable figures that have been incorporated with success in the preferred commercial embodiment of the invention. This constitutes making each cage two feet long, two feet deep and fourteen inches high, using one inch square mesh for the end walls, floor and rear wall, with one by two inch mesh for the roof and one by one and one-half inch mesh for the front wall. The ramp may have a length (rear to front dimension) of six inches, rising from a line five inches back from the plane of the front wall 24 to a height of four inches above the level of the floor 22 and there merging with the lower portion 36 of the front wall which itself has a height of one inch. The upper portion 34 of the front wall may have a height of six inches, making the slot 38 three inches wide (i.e., high). For use with a feed trough of the cross-sectional design shown, having a maximum width of four inches, the extension structure 40 should have a floor width of three inches, and the top 44 of such a structure will have a width of four inches.

Such a cage will efficiently accommodate an initial consignment of twenty chicks. After approximately six weeks growth the chicks will crowd the cage and it will be found desirable to remove half of them into another cage and continue each group of ten chicks per cage through the remainder of the twenty weeks growing period, at which time the birds are ready for removal to the cages of a laying battery, or for processing as fryers, broilers or otherwise as may be desired or required by their sex, condition, marketing demands and the like.

It is believed that those skilled in the art will adequately understand the principles of the invention, and the best mode of practicing it, from the foregoing description and accompanying illustration of the preferred embodiment, and will understand that such embodiment is given by way of exemplification only and that the principles of the invention are capable of being incorporated in other and further modified forms.

We claim:

1. A starter-grower cage for chicks comprising an enclosure having a floor terminating forwardly in an upwardly sloping ramp, an upper front wall portion terminating in a bottom edge spaced directly above the front edge of the ramp, a feed trough secured outside the enclosure having the upper edge of its inner side wall fixed in spaced relation substantially directly below said bottom edge of the upper front wall portion and cooperating with said bottom edge of the upper front wall portion to form a slot in the front wall of the enclosure, and a structure providing a spatial extension of the enclosure extending from the bottom edge of the upper front wall portion and terminating substantially adjacent said upper edge of said inner side wall of the trough, said extension structure having a wire mesh top wall sloping downwardly and outwardly from the upper edge of the front wall portion and a bottom disposed in fixed relation to said upper edge of the trough extending horizontally therefrom out over the feed trough, whereby chicks standing at selected heights on the ramp are able to project their heads through the slot, out into the extension structure, beneath the top wall thereof, and thrust their beaks down through the horizontal bottom of the structure with substantially equal access to all areas of the horizontal surface of feed in the trough.

2. A starter-grower cage as claimed in claim 1 in which the upper front wall portion is formed of wire mesh and the extension structure is integral therewith and the top wall of the extension structure is bent back from its forward edge to provide said horizontal bottom of the structure and is connected at its rear edge to the front edge of the ramp.

3. A starter-grower cage for chicks as claimed in claim 1 including a strip of wire mesh adapted to lie loosely on feed in the trough to minimize scattering of feed therefrom.

References Cited

UNITED STATES PATENTS

| 1,882,342 | 10/1932 | Swanson | 119—34 |
| 1,918,125 | 7/1933 | Petersime | 119—33 |
| 2,041,049 | 5/1936 | Crawford | 119—17 |
| 2,252,348 | 8/1941 | Mager | 119—17 |
| 2,309,458 | 1/1943 | Ingraham | 119—18 X |
| 2,636,475 | 4/1953 | Moyer | 119—61 |
| 3,274,972 | 9/1966 | Keen et al. | 119—18 X |

FOREIGN PATENTS 1,010,026 11/1965 Great Britain.

HUGH R. CHAMBLEE, Primary Examiner

U.S. Cl. X.R.

119—33